(12) United States Patent
Kataumi et al.

(10) Patent No.: US 6,427,503 B2
(45) Date of Patent: Aug. 6, 2002

(54) KEY INTERLOCK MECHANISM FOR COLUMN AUTOMATIC-TRANSMISSION OPERATING DEVICE

(75) Inventors: Yoshimasa Kataumi, Saitama; Ryoichi Fujiwara, Shizuoka; Takashi Maruta, Kanagawa, all of (JP)

(73) Assignees: Fuji Kiko Co., Ltd., Kosai; Nissan Shatai Co., Ltd., Hiratsuka (JP)

(*) Notice: Subject to any disclaimer, the term of this patent is extended or adjusted under 35 U.S.C. 154(b) by 49 days.

(21) Appl. No.: 09/730,531

(22) Filed: Dec. 7, 2000

(30) Foreign Application Priority Data

Feb. 16, 2000 (JP) .......................................... 2000-037393

(51) Int. Cl.[7] .......................... B60R 25/06; E05B 65/12
(52) U.S. Cl. ............................................ 70/247; 70/183
(58) Field of Search .......................... 70/245, 247, 252, 70/182–186

(56) References Cited

U.S. PATENT DOCUMENTS

| 1,251,987 A | * | 1/1918 | McFarland | 403/273 |
| 1,622,500 A | * | 3/1927 | Fairchild et al. | 70/185 |
| 4,387,582 A | * | 6/1983 | Meunier | 70/186 |
| 4,773,241 A | * | 9/1988 | Peitsmeier et al. | 70/252 |
| 4,776,189 A | * | 10/1988 | Weber et al. | 70/182 |
| 5,036,686 A | * | 8/1991 | Ichinose | 70/186 |
| 5,050,411 A | * | 9/1991 | Kawachi et al. | 70/248 |

FOREIGN PATENT DOCUMENTS

| DE | 2123071 A | * | 1/1984 | 70/252 |
| DE | 4142616 A1 | * | 6/1993 | 70/247 |

* cited by examiner

*Primary Examiner*—Lynne H. Browne
*Assistant Examiner*—John B Walsh
(74) *Attorney, Agent, or Firm*—Foley & Lardner

(57) ABSTRACT

A key interlock mechanism for a column automatic-transmission operating device includes a key lock lever having one end with a slot and swingably supporting the lock pin through the slot, a shank formed with the key lock lever, a guide groove formed with a unit base and cooperating with the shank to rotatably support the key lock lever so as to bias a lock pin in the direction of protruding into a key cylinder, and a key lock lever spring wound around the shank for biasing the key lock lever so that the lock pin protrudes into the key cylinder and for returning to a given position another end of the key lock lever which has moved along the guide groove.

6 Claims, 5 Drawing Sheets

KEY INTERLOCK MECHANISM FOR COLUMN AUTOMATIC-TRANSMISSION OPERATING DEVICE

BACKGROUND OF THE INVENTION

The present invention relates to key interlock mechanisms for column automatic-transmission operating devices for motor vehicles, and more particularly, to a structural improvement in the key interlock mechanisms.

A column automatic-transmission operating device includes a shift lever device mounted to a steering column so as to perform shift operation of an automatic transmission. The operating device is provided with a key lock mechanism which prevents a steering wheel from being rotated through disengagement of a lock pin from a key cylinder after removal of an ignition key in the parking (P) position of a shift or hand lever.

Conventionally, according to one structure of the key interlock mechanism, a key lock lever of a key interlock part and a lock pin of a key lock unit are connected through a cable to allow interlocking motion. Specifically, as being mounted to the steering column at different sites distant from each other, the key lock lever and the key cylinder are linked through the cable. According to another structure of the key interlock mechanism, the key interlock part is directly coupled with the lock pin of the key lock unit without any cable.

With the structure wherein the key interlock part and the lock pin of the key lock unit are connected through the cable, however, an inconvenience occurs that there is a need to provide cable space in a motor vehicle and carry out stringing and adjusting of the cable during its assemblage to the motor vehicle. On the other hand, with the structure wherein the key interlock part is directly coupled with the lock pin of the key lock unit, the key lock lever is directly rotated by the shift lever. This produces problems that a material of the key lock lever is limited to a metal due to required greater rigidity thereof, and that key interlock is difficult to achieve due to variations in parts with regard to their connection therebetween.

SUMMARY OF THE INVENTION

It is, therefore, an object of the present invention to provide key interlock mechanisms for column automatic-transmission operating devices, which allow easy assemblage to motor vehicles and sure achievement of key interlock with a reduction in required space and manufacturing cost.

Generally, the present invention provides a key interlock mechanism for a column automatic-transmission operating device with a shift lever with a detent arm, comprising:
  a bracket which rotatably supports the shift lever;
  a base secured to said bracket;
  a key lock unit secured to said bracket, said key lock unit comprising a key cylinder;
  a lock pin which can substantially orthogonally protrude into said key cylinder;
  a key lock lever having one end with a slot and another end, said key lock lever swingably supporting said lock pin through said slot, wherein the detent arm of the shift lever can abut on said key lock lever;
  a shank formed with one of said base and said another end of said key lock lever;
  a guide groove formed with another of said base and said another end of said key lock lever, said guide groove cooperating with said shank to rotatably support said key lock lever so as to bias said lock pin in a direction of protruding into said key cylinder; and
  a spring wound around said shank, said spring biasing said key lock lever so that said lock pin protrudes into said key cylinder, said spring returning to a given position said another end of said key lock lever which has moved along said guide groove.

One aspect of the present invention is to provide an operating device for a column automatic transmission for a motor vehicle with a steering column, comprising:
  a shift lever with a detent arm;
  a bracket mounted to the steering column for rotatably supporting said shift lever;
  a base secured to said bracket;
  a key lock unit secured to said bracket, said key lock unit comprising a key cylinder;
  a lock pin which can substantially orthogonally protrude into said key cylinder;
  a key lock lever having one end with a slot and another end, said key lock lever swingably supporting said lock pin through said slot, wherein said detent arm of said shift lever can abut on said key lock lever;
  a shank formed with one of said base and said another end of said key lock lever;
  a guide groove formed with another of said base and said another end of said key lock lever, said guide groove cooperating with said shank to rotatably support said key lock lever so as to bias said lock pin in a direction of protruding into said key cylinder; and
  a spring wound around said shank, said spring biasing said key lock lever so that said lock pin protrudes into said key cylinder, said spring returning to a given position said another end of said key lock lever which has moved along said guide groove.

DETAILED DESCRIPTION OF THE INVENTION

Figure 1:
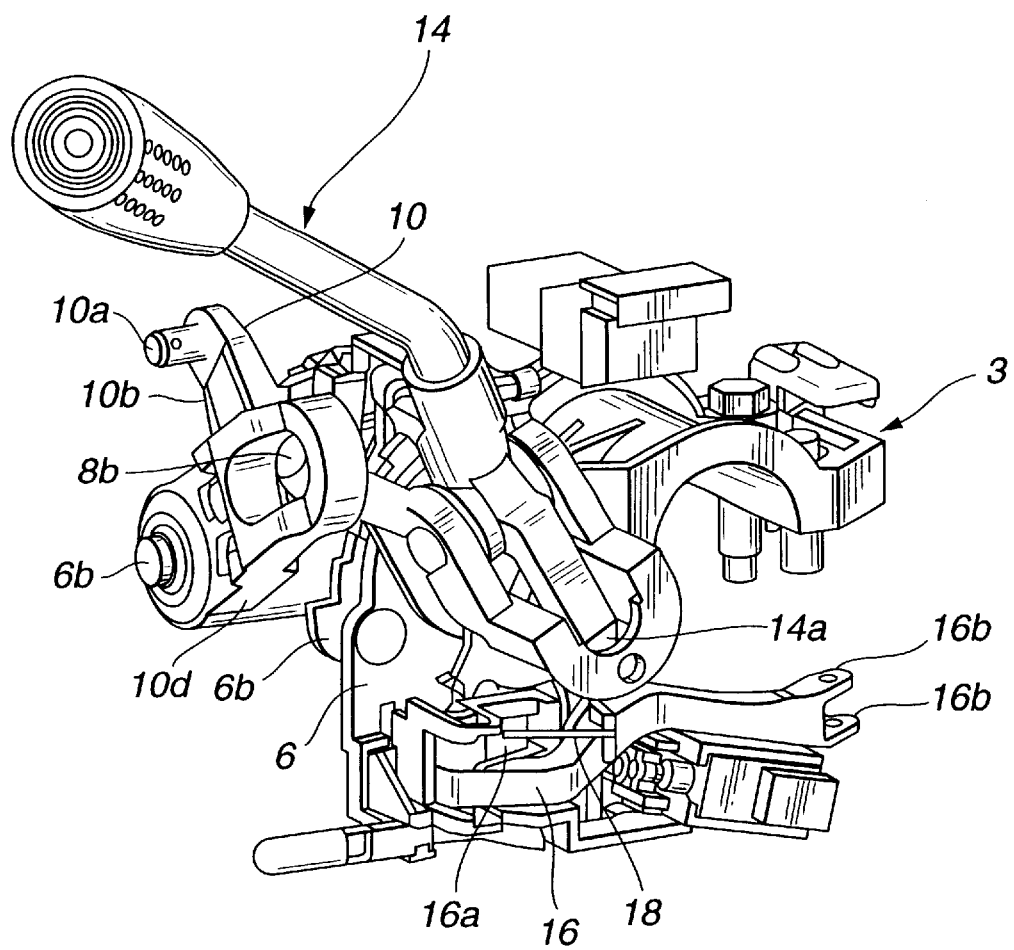
FIG. 1 is a perspective view showing a key interlock mechanism for a column automatic-transmission operating device embodying the present invention.
Figure 2:
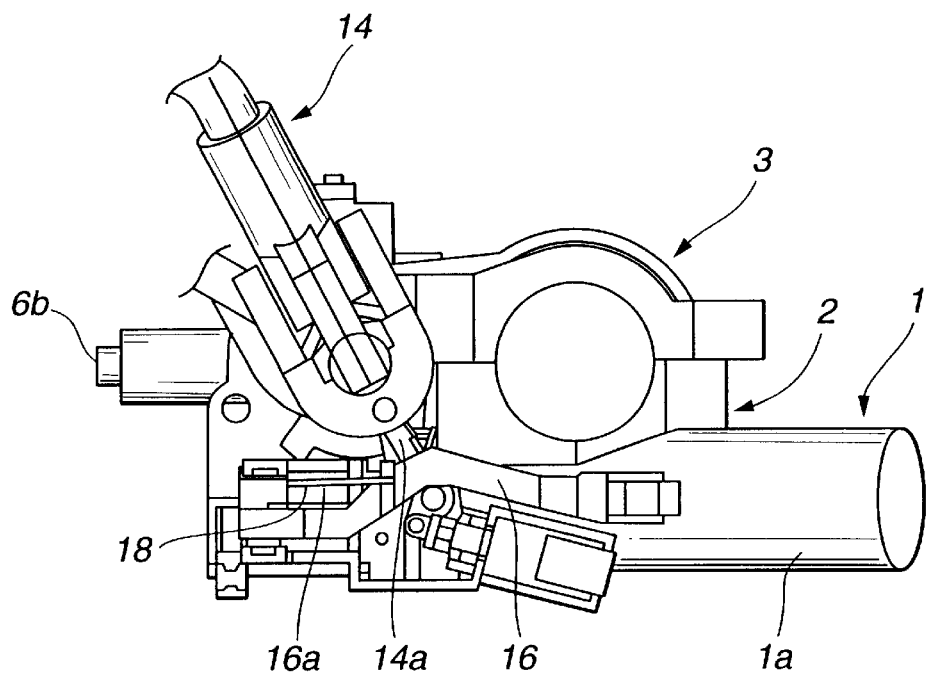
FIG. 2 is a front view showing the key interlock mechanism.
Figure 3:
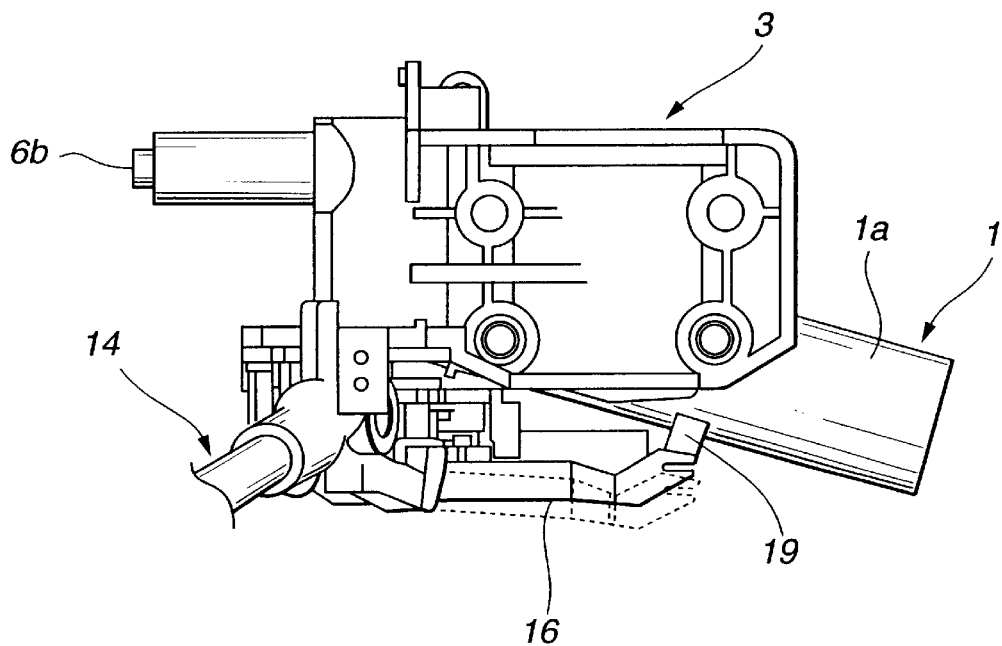
FIG. 3 is a plan view showing the key interlock mechanism.

Referring to the drawings, a description will be made with regard to a preferred embodiment of a key interlock mechanism for a column automatic-transmission operating device. Referring to FIGS. 1–4, the key interlock mechanism for a column automatic-transmission operating device comprises a key lock unit 1, a bracket 2 to which the key lock unit 1 is secured, and a base 3 which cooperates with the bracket 2 to hold a jacket tube 4 through bolts 5. The bracket 2 is secured to a steering column, not shown, in a well-known way. An auxiliary bracket 2a is disposed on and secured to the bracket 2. Thus, the jacket tube 4 and a key cylinder 1a are arranged crosswise.

The base 3 comprises a roughly sector-shaped plate 6, a hollow shank 6a parallel to the jacket tube 4, and a solid shank 6b orthogonal to the hollow shank 6a, which are integrally formed with each other by casting. A shaft 8a of a free rotation part 8 is rotatably arranged through the hollow shank 6a, whereas a crank lever 10 is rotatably engaged with the solid shank 6b through a hole 10g. The free rotation part 8 serves to support a shift or hand lever 14 to be rotatable in the longitudinal direction of a vehicle body by receiving a hollow shank 14c of the hand lever 14 in an opening 8d, and arranging a shaft 15 through the free rotation part 8 and the hand lever 14.

The free rotation part 8 comprises a ball portion 8b protruding sideward and a stopper 8c which are integrated with each other. The ball portion 8b engages with an engagement 10c of the crank lever 10, whereas the stopper 8c abuts on a bottom 6e of the plate 6 obtained by bending its lower end backward to serve as a rotation stop.

A moderating member 12 with a corrugated surface is integrally coupled with the crank lever 10 through a mounting portion 10e. When shifting the hand lever 14, the moderating member 12 provides a feeling of moderation by slide contact with an end of a plate spring 13 secured to a mounting portion 6c of the plate 6. A protrusion 10a is arranged with the crank lever 10 to engage with an end of a shift cable, not shown, introduced via a cable guide 11.

The hand lever 14 comprises a detent pin 14b protruding frontward of the hollow shank 14c and a detent arm 14a arranged at the back of the hollow shank to extend downward. The detent pin 14b engages with and releases from a position plate 6d secured to the rear face of the plate 6 so as to establish a shift stage of an automatic transmission. The detent arm 14a abuts on a key lock lever 16 supported by a unit base 7 to rotate the key lock lever 16. The unit base 7 is secured to a unit-base mounting bracket 6f formed in a lower portion of the plate 6.

Figure 4:
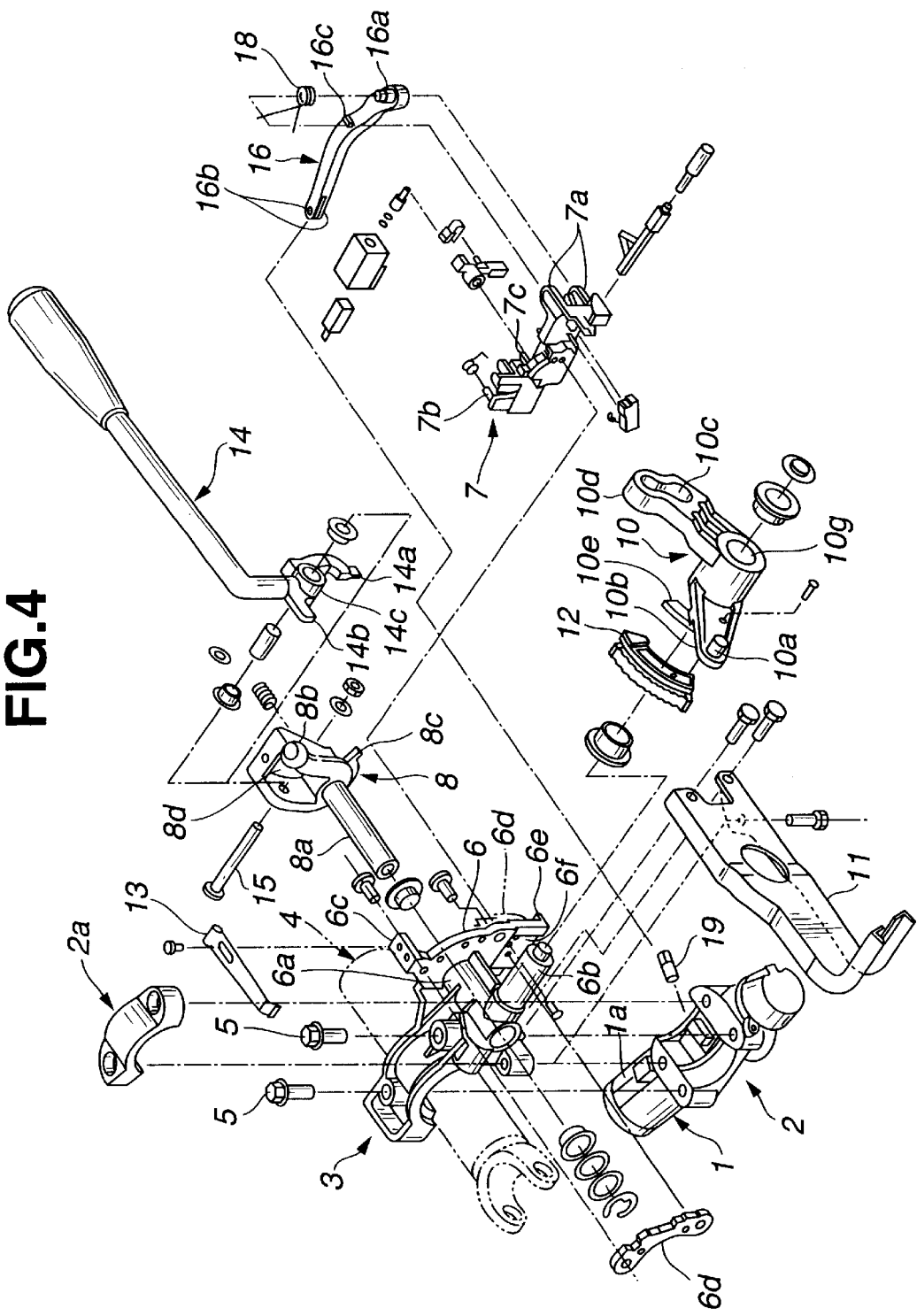
FIG. 4 is an exploded perspective view showing the key interlock mechanism.
Figure 5:
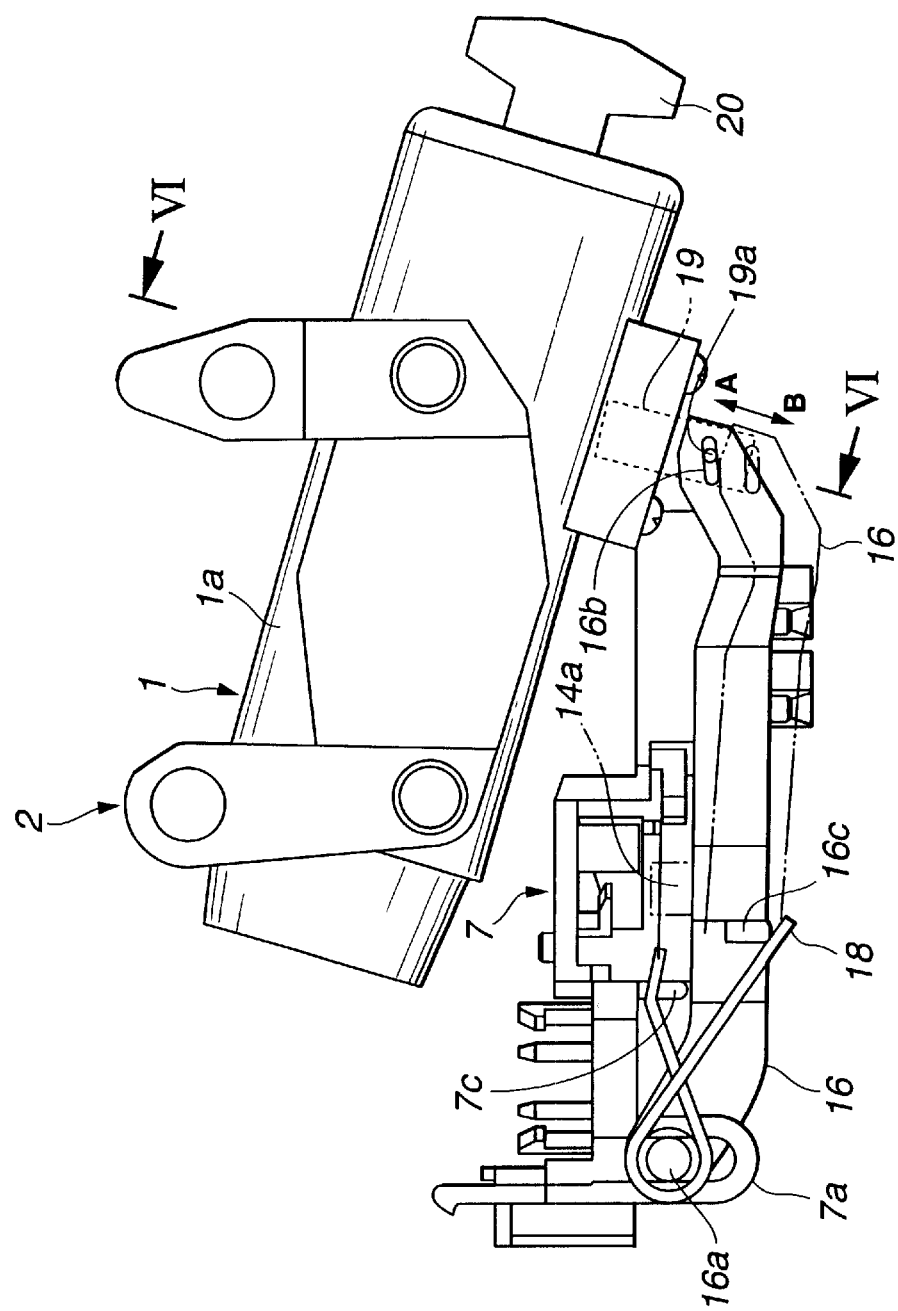
FIG. 5 is a fragmentary enlarged view showing the key interlock mechanism.

As seen in FIG. 4, the key lock lever 16 is in the form of a resin molding, having one end with which a shank 16a is integrated and another end bifurcated into upper and lower portions with respective slots 16b. Upper and lower ends of the shank 16a are supported in guide grooves 7a formed with the unit base 7. In the illustrative embodiment, the guide groove 7a is in the form of a closed slot with an end closed. Optionally, the guide groove 7a may be in the form of a slot without closing an end. A key lock lever spring 18 is wound around the shank 16a, and has two crossed ends, one of which engaging with an engagement 7c formed with the unit base 7 and another of which abutting on a protrusion 16c integrated with the key lock lever 16. Referring also to FIG. 5, pins 19a protrude from the outer peripheral surface of a lock pin 19 to face each other in the diametral direction. The pins 19a engage with the respective slots 16b to allow the lock pin 19 to move along the slots 16b.

Figure 7A:
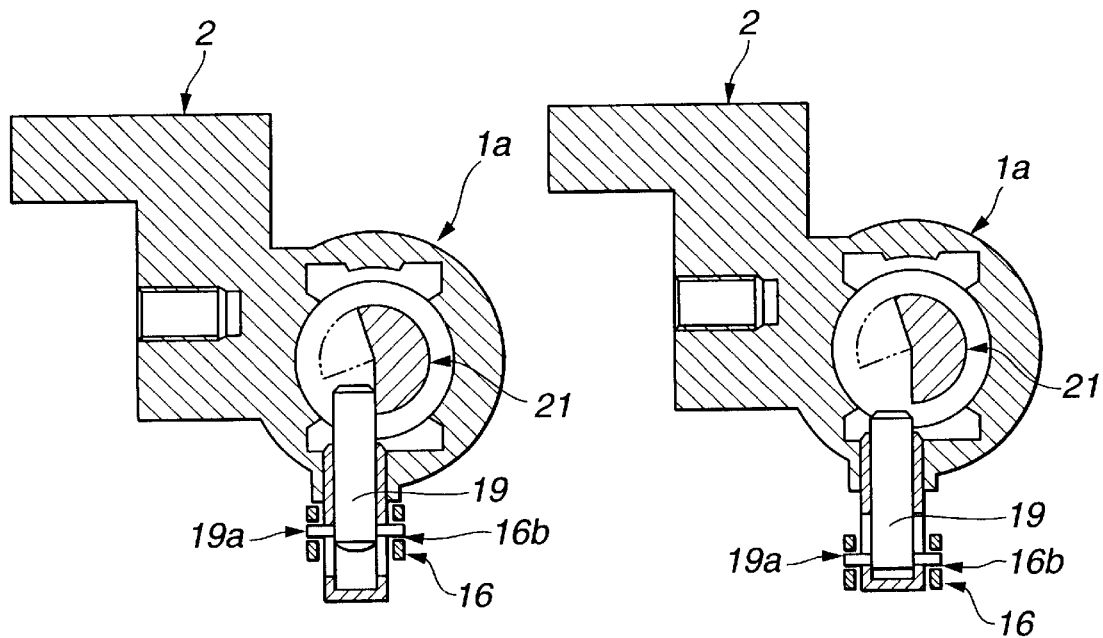
FIGS. 7A–7B are sectional views each taken along the line VII—VII in FIG. 5.

Thus, referring to FIGS. 5 and 7A, since the key lock lever 16 is always biased counterclockwise as viewed in FIG. 5, i.e. in the direction of arrow A about the shank 16a, the lock pin 19 is always fitted in a key cylinder 1a as shown in FIG. 7A, wherein a rotator 21 which rotates together with a key 20 is prevented by the lock pin 19 from rotating from an OFF position to a LOCK position. As a result, the key 20 cannot be removed from the key cylinder 1a.

Figure 7B:
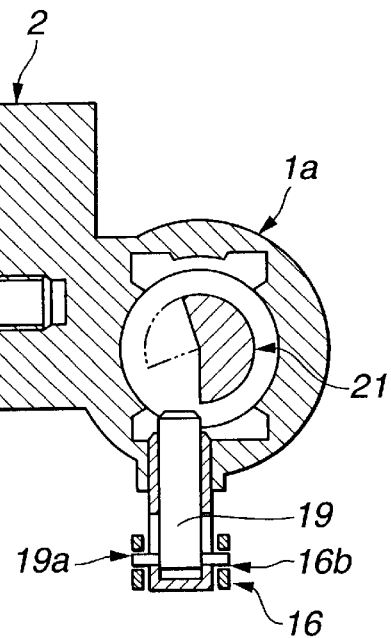

This state corresponds to the state where the hand lever 14 is operated to have the detent pin 14b shifted in any range of the position plate 6d other than P range. When operating the hand lever 14 to have the detent pin 14b shifted to the P range of the position plate 6d, the detent arm 14a abuts on the key lock lever 16 as shown by two-dot chain line in FIG. 5 to rotate the key lock lever clockwise as viewed in FIG. 5 about the shank 16a. Thus, referring also to FIG. 7B, the lock pin 19 is moved to separate from the key cylinder 1a, i.e. in the direction of arrow B in FIG. 5, the lock pin 19 which has prevented rotation of the rotator 21 goes out of the rotation range of the rotator 21. This allows the key 20 to rotate to the LOCK position where the key 20 can be removed from the key cylinder 1a.

Figure 6:
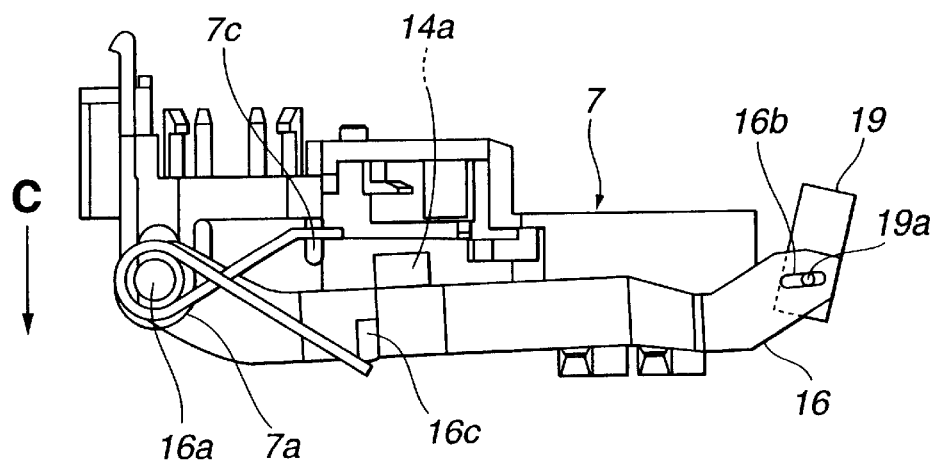
FIG. 6 is a view similar to FIG. 5, explaining operation of the embodiment.

Referring to FIG. 6, upon shift operation of the hand lever 14, if the detent arm 14a strongly abuts on the key lock lever 16 to inattentively provide an excessive force to the key lock lever 16, the shank 16a of the key lock lever 16 can move along the guide grooves 7a in the direction of arrow C in FIG. 6. Here, both ends of the key lock lever spring 18 engage with or abut on the engagement 7c and the protrusion 16c, respectively, so that key lock lever spring undergoes a winding force to absorb energy of the force. And the energized key lock lever spring 18 can return the shank 16a to a given position along the guide grooves 7a.

Thus, even if an excessive force is applied to the key lock lever 16 when the key lock lever rotates as the detent arm 14a is swung by shift operation of the hand lever 14, the ends of the shank 16a of the key lock lever 16 movably supported in the respective guide grooves 7a can move in the range of the respective guide grooves 7a. This can involve winding of the key lock lever spring 18 to absorb energy of the force, enabling absorption of an impact on the detent arm 14a. Therefore, there is no potential of fracture or breakage of the key lock lever 16.

Having described the present invention with regard to the preferred embodiment, it is noted that the present invention is not limited thereto, and various changes and modifications can be made without departing from the scope of the present invention. By way of example, in the illustrative embodiment, the guide grooves 7a are formed with the unit base 7, and the shank 16a of the key lock lever 16 is constructed to be movable in the guide grooves 7a. Optionally, the guide groove(s) may be formed with another end of the key lock lever 16, and a shank may be formed with the unit base 7 to engage with the guide groove(s). In this case, the key lock lever spring 18 is wound around the shank of the unit base 7.

The entire contents of Japanese Patent Application No. 2000-37393 are incorporated hereby by reference.

What is claimed is:

1. A key interlock mechanism for a column automatic-transmission operating device with a shift lever with a detent arm, comprising:
   a bracket which rotatably supports the shift lever;
   a base secured to said bracket;
   a key lock unit secured to said bracket, said key lock unit comprising a key cylinder;
   a lock pin which can substantially orthogonally protrude into said key cylinder;
   a key lock lever having one end with a slot and another end, said key lock lever swingably supporting said lock pin through said slot, wherein the detent arm of the shift lever can abut on said key lock lever;
   a shank formed with one of said base and said another end of said key lock lever;
   a guide groove formed with another of said base and said another end of said key lock lever, said guide groove cooperating with said shank to rotatably support said key lock lever so as to bias said lock pin in a direction of protruding into said key cylinder; and a spring wound around said shank, said spring biasing said key lock lever so that said lock pin protrudes into said key cylinder, said spring returning to a given position said another end of said key lock lever which has moved along said guide groove.

2. The key interlock mechanism as claimed in claim 1, wherein said slot of said key lock lever is disposed parallel with respect to a direction of crossing said lock pin.

3. The key interlock mechanism as claimed in claim 1, wherein said guide groove is disposed parallel with respect to a direction of a force caused by the detent arm abutting on said key lock lever.

4. An operating device for a column automatic transmission for a motor vehicle with a steering column, comprising:

a shift lever with a detent arm;

a bracket mounted to the steering column for rotatably supporting said shift lever;

a base secured to said bracket;

a key lock unit secured to said bracket, said key lock unit comprising a key cylinder;

a lock pin which can substantially orthogonally protrude into said key cylinder;

a key lock lever having one end with a slot and another end, said key lock lever swingably supporting said lock pin through said slot, wherein said detent arm of said shift lever can abut on said key lock lever;

a shank formed with one of said base and said another end of said key lock lever;

a guide groove formed with another of said base and said another end of said key lock lever, said guide groove cooperating with said shank to rotatably support said key lock lever so as to bias said lock pin in a direction of protruding into said key cylinder; and a spring wound around said shank, said spring biasing said key lock lever so that said lock pin protrudes into said key cylinder, said spring returning to a given position said another end of said key lock lever which has moved along said guide groove.

5. The operating device as claimed in claim 4, wherein said slot of said key lock lever is disposed parallel with respect to a direction of crossing said lock pin.

6. The operating device as claimed in claim 4, wherein said guide groove is disposed parallel with respect to a direction of a force caused by said detent arm abutting on said key lock lever.

* * * * *